United States Patent
Shin et al.

(10) Patent No.: US 10,028,217 B2
(45) Date of Patent: Jul. 17, 2018

(54) METHOD FOR POWER-SAVING IN ELECTRONIC DEVICE AND ELECTRONIC DEVICE THEREOF

(71) Applicant: Samsung Electronics Co., Ltd., Gyeonggi-do (KR)

(72) Inventors: Jae-Wook Shin, Gyeonggi-do (KR); Ju-Beam Lee, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 128 days.

(21) Appl. No.: 15/073,465

(22) Filed: Mar. 17, 2016

(65) Prior Publication Data
US 2016/0274645 A1   Sep. 22, 2016

(30) Foreign Application Priority Data
Mar. 17, 2015 (KR) .................. 10-2015-0036928

(51) Int. Cl.
*G06F 1/32* (2006.01)
*H04W 52/02* (2009.01)

(52) U.S. Cl.
CPC ...... *H04W 52/0209* (2013.01); *G06F 1/3293* (2013.01); *Y02D 10/122* (2018.01); *Y02D 70/00* (2018.01); *Y02D 70/122* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(58) Field of Classification Search
CPC ... G06F 1/3293; H04W 52/0209; Y02B 60/50
See application file for complete search history.

(56) References Cited

U.S. PATENT DOCUMENTS

| | | | |
|---|---|---|---|
| 9,436,970 B2* | 9/2016 | Connell | .................. G06T 1/20 |
| 2004/0263521 A1* | 12/2004 | Booth, Jr. | ............. G06F 9/3877 345/520 |
| 2007/0109292 A1* | 5/2007 | Dahan | .................... G09G 5/363 345/211 |
| 2013/0002596 A1* | 1/2013 | Ke | ........................ G06F 1/3203 345/173 |

FOREIGN PATENT DOCUMENTS

| | | | |
|---|---|---|---|
| KR | 10-1996-0011482 A | 4/1996 | |
| KR | 10-2002-0084629 A | 11/2002 | |

* cited by examiner

*Primary Examiner* — Fahmida Rahman

(57) ABSTRACT

Provided is a method and apparatus for reducing an amount of power consumed in an electronic device. The electronic device includes a first processor and a second processor. The second processor bypasses at least one of a user input and a screen output with respect to the first processor, and stores screen data input from the first processor in a frame buffer, while the second processor executes a bypass operation. The first processor processes at least one of a user input and a screen output, through the second processor that executes the bypass operation, and when a specified power-saving operation entry condition is satisfied, the first processor changes the second processor into a processing operation and changes into a sleep operation. The second processor processes at least one of a user input and a screen output using screen data stored in the frame buffer during the processing operation.

18 Claims, 11 Drawing Sheets

METHOD FOR POWER-SAVING IN ELECTRONIC DEVICE AND ELECTRONIC DEVICE THEREOF

CROSS-REFERENCE TO RELATED APPLICATION AND CLAIM OF PRIORITY

The present application is related to and claims benefit under 35 U.S.C. § 119(a) to Korean Application Serial No. 10-2015-0036928, which was filed in the Korean Intellectual Property Office on Mar. 17, 2015, the entire content of which is hereby incorporated by reference.

TECHNICAL FIELD

The present disclosure relates to a method and apparatus for saving power by reducing an amount of power consumed in an electronic device.

BACKGROUND

Electronic devices employ various technologies for power-saving. For example, when an electronic device does not output a screen through a display or does not change a currently output screen during a specified period of time, the processor of the electronic device may be changed into a sleep operation. When the processor is in the sleep operation, an amount of power consumed for driving the processor is reduced when compared to the case of a processing operation and thus, power is saved.

When the electronic device needs to output a new screen, or needs to change a currently output screen, the processor that is in the sleep operation may wake up and perform a processing operation. In the processing operation, the processor may execute an operation and a screen update, to output the new screen or to change the currently output screen.

SUMMARY

The operations of a processor in a case of scrolling a screen, such as a browser screen, an image screen, or the like, which is currently output in an electronic device, may be simpler than a case of newly loading and outputting a screen such as a browser screen, an image screen, or the like.

The electronic device may output or change a simple user interface screen. The simple user interface screen is a user interface screen that displays simple information, for example, a clock screen, an alarm screen, and the like, unlike a screen that displays complex information such as a browser screen. The operation of the process in a case of outputting or changing the simple user interface screen may be simpler than, for example, a case of loading a browser screen from a website and outputting the same.

However, even when the electronic device executes the simple operation as described above, the processor in the sleep operation needs to wake up and needs to execute a processing operation and thus, power may be consumed for driving the processor.

To address the above-discussed deficiencies, it is a primary object to provide a power-saving method and apparatus that reduces an amount of power consumed when a processor is driven to output a screen, so as to save power.

Various embodiments of the present disclosure provide a method of saving power in an electronic device, the method including: bypassing, by a second processor in the electronic device, at least one of a user input and a screen output with respect to a first processor in the electronic device, and storing, by the second processor, screen data input from the first processor in a frame buffer while a second processor executes a bypass operation; processing, by the first processor, at least one of the user input and the screen output through the second processor that executes the bypass operation, changing, by the first processor, the second processor into a processing operation and changing the first processor into a sleep operation when a specified power-saving operation entry condition is satisfied; and processing, by the second processor, at least one of the user input and the screen output using the screen data stored in the frame buffer until a specified power-saving operation termination condition is satisfied, while the second processor executes the processing operation.

Various embodiments of the present disclosure provide an electronic device, the electronic device including: an input module configured to receive an input from a user; a display configured to output the screen based on screen data; a frame buffer configured to store screen data for outputting the screen through the display; a first processor configured to process at least one of a user input through the input module and a screen output through the display through a second processor executing a bypass operation, and change the second processor into a processing operation and the first processor into a sleep operation when a specified power-saving operation entry condition is satisfied; and the second processor configured to bypass at least one of the user input and the screen output between the input module and display and the first processor, store screen data that is input from the first processor in the frame buffer while the second processor executes the bypass operation, and process at least one of the user input and a screen output using screen data stored in the frame buffer until a specified power-saving operation termination condition is satisfied, while the second processor executes the processing operation.

According to various embodiments of the present disclosure, while a specified power-saving operation entry condition is satisfied, a main processor executes a sleep operation and a sub-processor processes at least one of a user input and a screen output, and thus, an electronic device may save power by reducing an amount of power consumed for driving the main processor.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
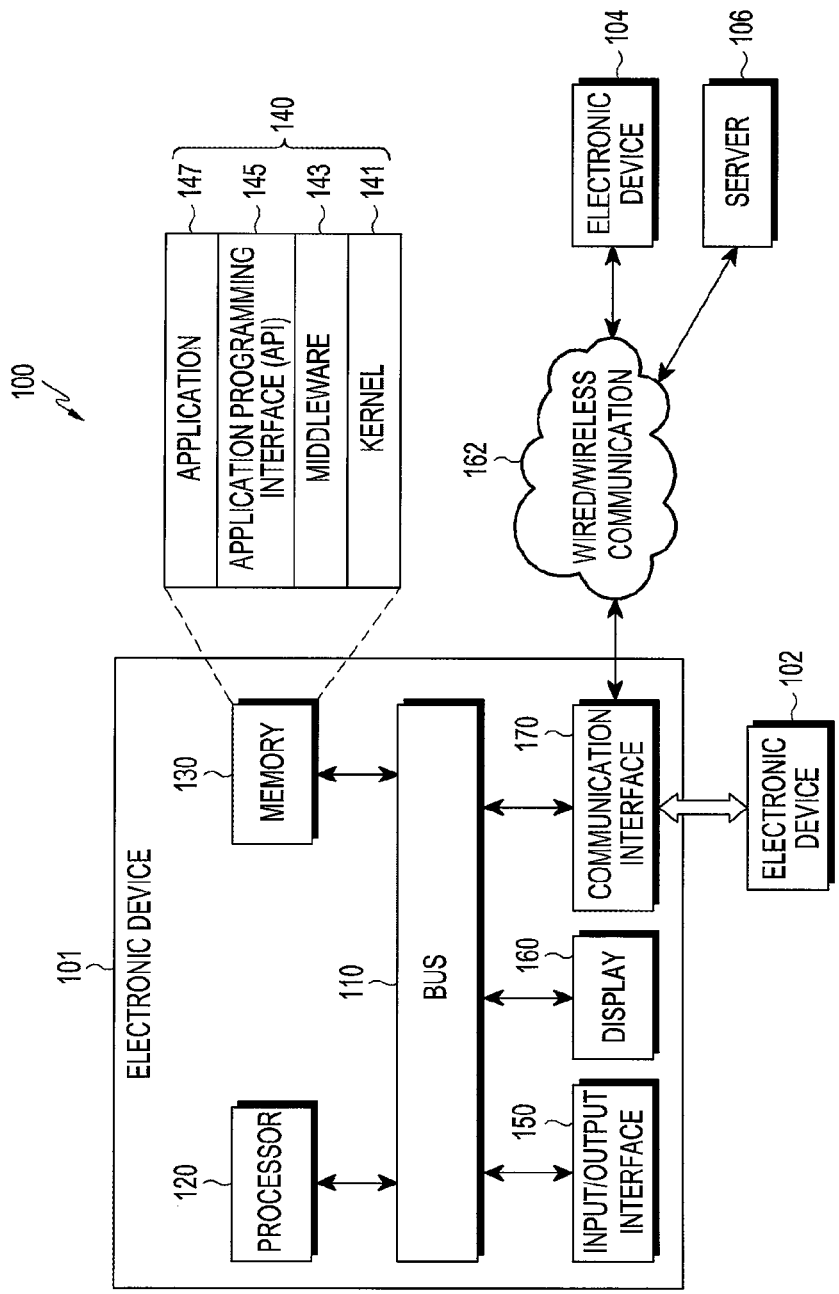
FIG. 1 illustrates a network environment including an electronic device according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Hereinafter, various embodiments of the present disclosure will be described in connection with the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expressions such as "first", "second", or the like used in various embodiments of the present disclosure may modify various elements regardless of order or importance, and do not limit corresponding elements. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The expression "configured to" may not necessarily mean "specially designed to" in terms of hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The "specified" used in the present document may include meaning of, for example, the "predetermined" or the "specific" according to a situation.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an moving picture experts group 1 (MPEG-1) audio layer-3 (MP3) player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device may be a smart home appliance. The smart home appliance may, for example, include at least one of a television, a digital video disk (DVD) player, an audio player, a refrigerator, an air conditioner, a cleaner, an oven, a microwave oven, a washing machine, an air purifier, a set-top box, a home automation control panel, security control panel, a TV box (e.g., HomeSync™ of Samsung, Apple TV™, or Google™), a game console (e.g., Xbox™, PlayStation™), an electronic dictionary, an electronic key, a camcorder, and an electronic frame.

According to another embodiment, the electronic devices may include at least one of various medical devices (e.g., various portable medical measurement devices (a blood glucose meter, a heart rate meter, a blood pressure meter, or a body temperature meter), a magnetic resonance angiography (MRA), a magnetic resonance imaging (MRI), a computed tomography (CT) machine, and an ultrasonic machine), navigation equipment, global positioning system (GPS) receivers, event data recorders (EDRs), flight data recorders (FDRs), vehicle infotainment devices, electronic equipment for ships (e.g., navigation equipment for ships and gyro-compasses), avionics, security devices, automotive head units, home or industry robots, automatic teller's machines (ATMs) in bank systems, point of sales (POS) in shops, and Internet of things devices (e.g., bulbs, various sensors, electric or gas meters, sprinklers, fire alarms, thermostats, street lamps, toasters, exercise machines, hot water tanks, heaters, or boilers).

According to some embodiments, the electronic device may include at least one of furniture or a part of a building/structure, an electronic board, an electronic signature receiving device, a projector, and various types of measuring devices (for example, a water meter, an electric meter, a gas meter, a radio wave meter and the like) including a camera function.

In various embodiments, the electronic device may be a combination of one or more of the aforementioned various devices. According to some embodiments, the electronic device may also be a flexible device. Also, the electronic device according to various embodiments of the present disclosure is not limited to the above-mentioned devices, and with the development of technology, may include new electronic devices.

Hereinafter, an electronic device according to various embodiments of the present disclosure will be described with reference to the accompanying drawings. The term "user" as used in various embodiments of the present disclosure may refer to a person who uses an electronic device or a device (e.g., artificial intelligence electronic device) that uses an electronic device.

FIG. 1 illustrates a network environment 100 including an electronic device 101 according to various embodiments of the present disclosure.

Referring to FIG. 1, the network environment 100 may include electronic devices 101, 102, and 104, a server 106, and a network 162. According to an embodiment of the present disclosure, the electronic device 101 may be connected to an external electronic device (e.g., the first external electronic device 102, the second external electronic device 104, or the server 106) through the network 162. According to another embodiment of the present disclosure, the electronic device 101 may be directly connected to an external electronic device without the network 162.

The electronic device 101 may include a bus 110, a processor 120, a memory 130, an input/output interface 150, a display 160, and a communication interface 170. According to an embodiment of the present disclosure, the electronic device 101 may omit at least one of the above component elements 110 to 170 or may further include other component elements.

The bus 110 may include, for example, a circuit for connecting the component elements 110 to 170 of the electronic device 101, and transferring communication (e.g., control messages and/or data) between the component elements 110 to 170.

The processor 120 may include one or more of a Central Processing Unit (CPU), an Application Processor (AP), and a Communication Processor (CP). The processor 120, for example, may carry out operations or data processing relating to control and/or communication of at least one other component element of the electronic device 101. According to various embodiments of the present disclosure, the processor 120, which will be described, may include a main processor and a sub-processor. Alternatively, the main processor and the sub-processor may be separate processors.

The memory 130 may include a volatile memory and/or a non-volatile memory. The memory 130 may store, for example, instructions or data relevant to at least one other component element of the electronic device 101. According to an embodiment of the present disclosure, the memory 130 may store software and/or a program 140. For example, the program 140 may include a kernel 141, a middleware 143, an Application Programming Interface (API) 145, and/or application program (or application) 147. At least some of the kernel 141, the middleware 143, and the API 145 may be referred to as an Operating System (OS).

For example, the kernel 141 may control or manage system resources (e.g., the bus 110, the processor 120, the memory 130, and the like) which are used to execute an operation or a function implemented in the other programs (e.g., the middleware 143, the API 145, or the application programs 147). Furthermore, the kernel 141 may provide an interface through which the middleware 143, the API 145, or the application programs 147 may access the individual component elements of the electronic device 101 to control or manage the system resources.

The middleware 143, for example, may function as an intermediary for allowing the API 145 or the application programs 147 to communicate with the kernel 141 to exchange data. Further, in association with operation requests received from the application program 147, the middleware 143 may execute a control (e.g., scheduling or load balancing) for an operation request, using, for example, a method of assigning, to at least one of applications, a priority for using a system resource (e.g., the bus 110, the processor 120, the memory 130, etc.) of the electronic device 101.

The API 145 is, for example, an interface through which the applications 147 control functions provided by the kernel 141 or the middleware 143, and may include at least one interface or function (e.g., an instruction) for file control, window control, image processing, or text control.

The input/output interface 150, for example, may function as an interface that may transfer instructions or data input from a user or another external device to the other component element(s) of the electronic device 101. Also, the input/output interface 150 may output instructions or data received from other component element(s) of the electronic device 101 to the user or another external device.

The display 160 may include, for example, a Liquid Crystal Display (LCD), a Light-Emitting Diode (LED) display, an Organic Light-Emitting Diode (OLED) display, a Micro Electro Mechanical Systems (MEMS) display, and an electronic paper display. The display 160, for example, may display various types of contents (e.g., text, images, videos, icons, or symbols) to the user. The display 160 may include a touch screen, and may receive, for example, a touch, gesture, proximity, or hovering input using an electronic pen or a user's body part.

The communication interface 170, for example, may establish communication between the electronic device 101 and an external device (e.g., the first external electronic device 102, the second external electronic device 104, or the server 106). For example, the communication interface 170 may be connected to the network 162 through wireless or wired communication to communicate with an external device (e.g., the second external electronic device 104 or the server 106).

Wireless communication may include, for example, at least one of Wireless Fidelity (Wi-Fi), Bluetooth (BT), Near Field Communication (NFC), Global Positioning System (GPS) or cellular communication (e.g., long term evolution (LTE), Long Term Evolution-Advanced (LTE-A), Code Division Multiple Access (CDMA), Wideband Code Division Multiple Access (WCDMA), Universal Mobile Telecommunication System (UMTS), Wireless Broadband (WiBro) or Global System for Mobile communications (GSM), or the like). The wired communication may include, for example, at least one of a Universal Serial Bus (USB), a Universal Asynchronous Receiver/Transmitter (UART), a Mobile High-definition Link (MHL), a High Definition Multimedia Interface (HDMI), Recommended Standard 232 (RS-232), and a Plain Old Telephone Service (POTS).

According to an embodiment of the present disclosure, the network 162 may include at least one of communication networks such as a computer network (e.g., a local area network (LAN) or a wide area network (WAN)), the Internet, and a telephone network.

Each of the first and second external electronic devices 102 and 104 may be of a type that is the same as or different from the electronic device 101. According to an embodiment of the present disclosure, the server 106 may include a group of one or more servers. According to various embodiments of the present disclosure, all or some of the operations performed by the electronic device 101 may be performed by another electronic device or a plurality of electronic devices (e.g., the first external electronic device 102, the second external electronic device 104, or the server 106). According to an embodiment of the present disclosure, when the electronic device 101 should perform some functions or services automatically or by request, the electronic device 101 may request another device (e.g., the first external electronic device 102, the second external electronic device 104, or the server 106) to perform at least some of the functions related to the functions or services, in addition to or instead of performing the functions or services. The other electronic device (e.g., the first external electronic device 102, the second external electronic device 104, or the server 106) may carry out the requested function or the additional function, and transfer a result to the electronic device 101. The electronic device 101 may process the received result as it is or additionally, so as to provide the requested functions or services. To this end, for example, cloud computing, distributed computing, or client-server computing technology may be used.

Figure 2:
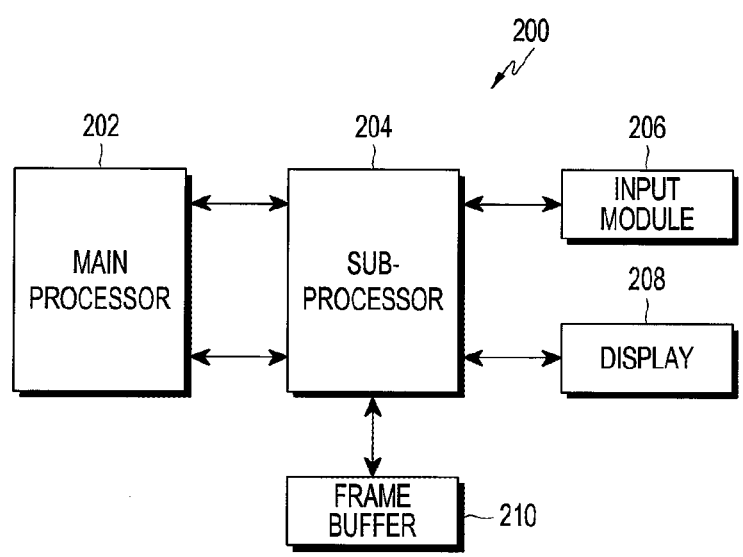
FIG. 2 illustrates an example of a configuration of an electronic device for saving power according to various embodiments of the present disclosure.

FIG. 2 is a block diagram illustrating an example of a configuration of an electronic device for saving power according to various embodiments of the present disclosure.

Referring to FIG. 2, an electronic device 200 may include a main processor 202, a sub-processor 204, an input module 206, a display 208, and a frame buffer 210. The electronic device 200 may be the electronic device 101 of FIG. 1.

The main processor 202 may be connected to the input module 206 and the display 208 through the sub-processor 204. The main processor 202 may be included in the processor 120 of the electronic device 101. According to an embodiment of the present disclosure, the main processor 202 may be an Application Processor (AP).

The main processor 202 may process at least one of a user input through the input module 206 and a screen output through the display 208, through the sub-processor 204 that executes a bypass operation. In the processing operation, the main processor 202 may store, in the frame buffer 210 through the sub-processor 204, screen data of a screen that the sub-processor 204 is to output to the display 208 during the processing operation. The screen data may be pixel data corresponding to a screen that is output through the display 208. When a specified power-saving operation entry condition is satisfied during the processing operation, the main processor 202 may change the sub-processor 204 into a processing operation, and may change the main processor 202 into a sleep operation. According to an embodiment of the present disclosure, the power-saving operation entry condition may be specified as a state in which a screen is not changed during a specified period of time. For example, when a user input for changing a screen is not received during the specified period of time while a screen is output through the display 208, the main processor 202 may determine that the power-saving operation entry condition is satisfied. According to an embodiment of the present disclosure, the processing operation of the main processor 202 may include an operation in which the main processor 202 processes at least one of a user input through the input module 206 and a screen output through the display 208, through the sub-processor 204. According to an embodiment of the present disclosure, the sleep operation of the main processor 202 may be an operation in which the main processor 202 operates in a sleep mode.

The sub-processor 204 may be connected between the main processor 202 and the input module 206 and display 208. The sub-processor 204 may be included in the processor 120 of the electronic device 101. According to an embodiment of the present disclosure, the sub-processor 204 may be a micro controller unit (MCU) that shows a lower performance when compared to the main processor 202, and consumes a significantly small amount of power. The sub-processor 204 may operate one of at least a bypass operation and a processing operation. According to an embodiment of the present disclosure, the bypass operation of the sub-processor 204 may be an operation in which the sub-processor 204 bypasses at least one of a user input through the input module 206 and a screen output through the display 208, between the main processor 208 and the input module 206 and display 208. According to an embodiment of the present disclosure, the processing operation of the sub-processor 204 may be an operation in which the sub-processor 204 processes at least one of a user input through the input module 206 and a screen output through the display 208, on behalf of the main processor 202 that currently executes a sleep operation.

During the bypass operation, the sub-processor 204 may bypass at least one of a user input through the input module 206 and a screen output through the display 208, between the main processor 202 and the input module 206 and display 208. During the bypass operation, the sub-processor 204 may store screen data input from the main processor 202, in the frame buffer 210.

During the processing operation, the sub-processor 204 may process at least one of a user input through the input module 206 and a screen output through the display 208, until a specified power-saving operation termination condition is satisfied. During the processing operation, the sub-processor 204 may process a screen output through the display 208 using screen data stored in the frame buffer 210. The power-saving operation termination condition may be specified as a state in which a screen is incapable of being output using the screen data stored in the frame buffer 210. For example, when all of the screen data required for a screen to be output through the display 208 are not stored in the frame buffer 210, the sub-processor 204 may determine that the power-saving operation termination condition is satisfied.

The sub-processor 204 may wake up the main processor 202 and change the sub-processor 204 into a bypass operation when the power-saving operation termination condition is satisfied during the processing operation. When a user input is received during the processing operation, the sub-processor 204 may store the user input, and when the sub-processor 204 wakes up the main processor 202, the sub-processor 204 may transfer the stored user input to the main processor 202.

The main processor 202 that wakes up from the sleep operation receives, from the sub-processor 204, a user input that occurs during the sleep operation, and thus, may accurately process the user input.

The input module 206 may receive an input from a user and outputs the input to the sub-processor 204. The input module 206 may include a touch panel, a button, and the like. The input module 206 may be included in the input/output interface 150 of the electronic device 101.

The display 208 may output a screen according to screen data provided from the sub-processor 204. The display 208 may be the display 160 of the electronic device 101.

The frame buffer 210 may be connected to the sub-processor 204 and may be accessed by the sub-processor 204. The frame buffer 210 may store screen data for outputting a screen through the display 208. A frame buffer that has a storage capacity larger than the size of a screen of the display 208 may be used as the frame buffer 210. The frame buffer 210 may store screen data of a screen that is larger than the size of the screen of the display 208. The frame buffer 210 may be included in the memory 130 of the electronic device 101. According to another embodiment of the present disclosure, when a display that supports a Panel Self Refresh (PSR) is used as the display 208, a frame buffer included in the display 208 may be used as the frame buffer 210.

According to various embodiments of the present disclosure, an electronic device may include an input module that receives an input from a user; a display that outputs a screen based on screen data; a frame buffer that stores screen data for outputting the screen through the display; a first processor that processes at least one of a user input through the input module and a screen output through the display, through a second processor executing a bypass operation, and changes the second processor into a processing operation and changes the first processor into a sleep operation, when a specified power-saving operation entry condition is satisfied; and the second processor that bypasses at least one of the user input and the screen output between the input module and display and the first processor, stores screen data that is input from the first processor in the frame buffer, while the second processor executes the bypassing operation and processes at least one of the user input and a screen output using screen data stored in the frame buffer, until a specified power-saving operation termination condition is satisfied, while the second processor executes the processing operation.

The second processor may wake up the first processor and may change the second processor into the bypass operation, when the power-saving operation termination condition is satisfied while the second processor executes the processing operation.

The power-saving operation entry condition may be specified as a state in which the screen is not changed during a specified period of time, and the power-saving operation termination condition may be specified as a state in which the screen is incapable of being output based on only screen data stored in the frame buffer.

The second processor may store a user input when the user input is received during the processing operation, and may transfer the stored user input to the first processor when waking up the first processor.

A storage capacity of the frame buffer is larger than a size of a screen of the display, and the second processor may input screen data of a browser screen that is larger than the size of the screen of the display, which is from the first processor, and may store the same in the frame buffer, during the bypass operation, and may scroll the browser screen to correspond to a scroll input using screen data stored in the frame buffer when the scroll input from a user is received, during the processing operation.

The second processor may input screen data of an image to be output to an image screen, which is from the first processor, and may store the same in the frame buffer, during the bypass operation, and may scroll the image screen to correspond to a scroll input using screen data stored in the frame buffer when the scroll input from a user is received, during the processing operation.

The second processor may input screen data to be used for outputting each of at least one user interface screen, which is from the first processor, and may store the same in the frame buffer, during the bypass operation, and may output the user interface screen using screen data stored in the frame buffer during the processing operation.

The at least one user interface screen includes a clock screen, and the second processor may input screen data of clock information to be output to the clock screen, which is from the first processor, and may store the same in the frame buffer, during the bypass operation, and may change and output time information of the clock screen using screen data of time information corresponding to the present time from among screen data of time information stored in the frame buffer when it is time to change time information of the clock screen, during the processing operation.

The at least one user interface screen includes an alarm screen, and the second processor may input screen data of alarm information to be output to the alarm screen, which is from the first processor, and may store the same in the frame buffer, during the bypass operation, and may output the alarm screen using screen data of alarm information corresponding to the present time from among the alarm information stored in the frame buffer when it is time to output the alarm screen, during the processing operation.

The first processor is a main processor of the electronic device, which is an Application Processor (AP), and the second processor is a sub-processor that is connected between the first processor and the display, which is a Micro Controller Unit (MCU).

Figure 3:
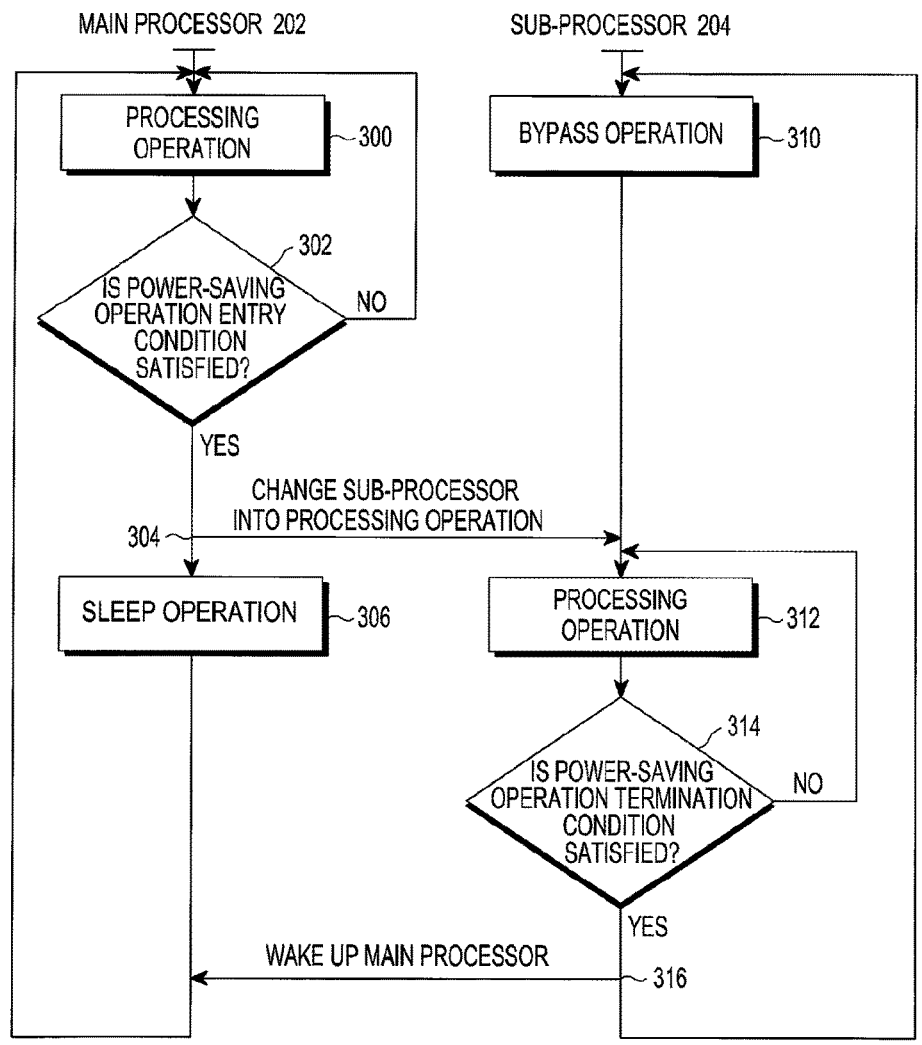
FIG. 3 illustrates a procedure in which an electronic device executes a power-saving operation according to various embodiments of the present disclosure.

FIG. 3 is a flowchart illustrating a procedure in which an electronic device executes a power-saving operation according to various embodiments of the present disclosure.

Referring to FIG. 3, the main processor 202 may execute a processing operation 300. While the main processor 202 executes the processing operation 300, the sub-processor 204 may execute a bypass operation 310. The main processor 202 may execute the processing operation 300 through the sub-processor 204 that currently executes the bypass operation 310. In the processing operation 300, the main processor 202 may process at least one of a user input through the input module 206 and a screen output through the display 208, through the sub-processor 204 that currently executes the bypass operation 310. In the processing operation 300, the main processor 202 may store, in the frame buffer 210 through the sub-processor 204, screen data of a screen that the sub-processor 204 outputs to the display 208 during a processing operation 312.

During the bypass operation 310, the sub-processor 204 may bypass at least one of a user input through the input module 206 and a screen output through the display 208, between the main processor 202 and the input module 206 and display 208. During the bypass operation 310, the sub-processor 204 may store screen data input from the main processor 202, in the frame buffer 210.

The main processor 202 may determine whether the specified power-saving operation entry condition is satisfied during the processing operation 300, in operation 302. When it is determined that the power-saving operation entry condition is not satisfied in operation 302, the main processor 202 may continue the processing operation 300. When it is determined that the power-saving operation entry condition is satisfied in operation 302, the main processor 202 may change the sub-processor 204 into a processing operation, in operation 304. After changing the sub-processor 203 into the processing operation, the main processor 202 may change into a sleep operation 306.

The sub-processor 204 in the bypass operation 310 may be changed by the main processor 202 into the processing operation 312 in operation 304. During the processing operation 312, the sub-processor 204 may process at least one of a user input through the input module 206 and a screen output through the display 208, until the specified power-saving operation termination condition is satisfied. During the processing operation 312, the sub-processor 204 may process a screen output through the display 208 using screen data stored in the frame buffer 210. When a user input through the input module 206 is received in the processing operation 312, the sub-processor 204 may store the user input.

The sub-processor 204 may determine whether the specified power-saving operation termination condition is satisfied during the processing operation 312, in operation 314. When it is determined that the power-saving operation termination condition is not satisfied in operation 314, the sub-processor 204 may continue the processing operation 312. When it is determined that the power-saving operation termination condition is satisfied in operation 314, the sub-processor 202 may wake up the main processor 202 and change the sub-processor 204 into the bypass operation 310 in operation 316. In operation 316, the sub-processor 204 may transfer, to the main processor 202, the user input stored during the processing operation 312. In operation 316, the main processor 202 may be woken up by the sub-processor 204 and may execute the processing operation 300. The main processor 202 that wakes up from the sleep operation 306 receives, from the sub-processor 204, a user input that occurs during the sleep operation 306, and thus, may accurately process the user input.

According to various embodiments of the present disclosure, a screen that is output by the sub-processor 204 in the processing operation 312 may be a browser screen, an image screen, or the like. The sub-processor 204 may input screen data of a browser screen or screen data of an image screen, which is from the main processor 202, and store the same in the frame buffer 210, in the bypass operation 310, so as to use the same for outputting the browser screen or the image screen in the processing operation 312. When the power-saving operation entry condition is satisfied while the electronic device 200 outputs a screen such as a browser screen, an image screen, or the like, the main processor 202 may execute the sleep operation 306. While the main processor 202 executes the sleep operation 306, the sub-processor 204 may process a user input and a screen output associated with a screen such as a browser screen, an image screen, or the like in the processing operation 312, on behalf of the main processor 202, until the power-saving operation termination condition is satisfied.

According to various embodiments of the present disclosure, a screen that is output by the sub-processor 204 in the processing operation 312 may be a simple user interface screen such as a clock screen, an alarm screen, or the like. The sub-processor 204 may input screen data of a clock screen or screen data of an alarm screen, which is from the main processor 202, and store the same in the frame buffer 210, in the bypass operation 310, so as to use the same for outputting the clock screen or the alarm screen in the processing operation 312. While the main processor 202 executes the sleep operation 306, the sub-processor 204 may process outputting a user interface screen such as a clock screen, an alarm screen, or the like in the processing operation 312, on behalf of the main processor 202, until the power-saving operation termination condition is satisfied.

According to various embodiments of the present disclosure, a method of saving power in an electronic device, includes: bypassing, by a second processor in the electronic device, at least one of a user input and a screen output with respect to a first processor in the electronic device, and storing, by the second processor, screen data input from the first processor in a frame buffer, while a second processor executes a bypass operation; processing, by the first processor, at least one of the user input and the screen output, through the second processor that executes the bypass operation, changing, by the first processor, the second processor into a processing operation and changing the first processor into a sleep operation, when a specified power-saving operation entry condition is satisfied; and processing, by the second processor, at least one of the user input and the screen output that uses the screen data stored in the frame buffer, until specified power-saving operation termination condition is satisfied, while the second processor executes the processing operation.

The processing operation executed by the second processor further includes waking up the first processor and changing the second processor into the bypass operation, when the power-saving operation termination condition is satisfied.

The power-saving operation entry condition may be specified as a state in which the screen is not changed during a specified period of time, and the power-saving operation termination condition may be specified as a state in which the screen is incapable of being output based on the screen data stored in the frame buffer.

The processing operation executed by the second processor may further include storing a user input when the user input is received; and the waking up of the first processor and the changing of the second processor into the bypass operation may further include transferring, by the second processor the stored user input to the first processor.

The bypass operation executed by the second processor may include: inputting, by the second processor, screen data of a browser screen that is larger than a size of a screen of a display, which is from the first processor, and storing the same in the frame buffer; and the processing operation executed by the second processor comprises: scrolling, by the second processor, the browser screen to correspond to a scroll input using screen data stored in the frame buffer when the scroll input from a user is received.

The bypass operation executed by the second processor may include: inputting, by the second processor, screen data of an image to be output to an image screen, which is from the first processor, and storing the same in the frame buffer; and the processing operation executed by the second processor may include: scrolling, by the second processor, the image screen to correspond to a scroll input using screen data stored in the frame buffer when the scroll input from a user is received.

The bypass operation executed by the second processor may include: inputting, by the second processor, screen data to be used for outputting at least one user interface screen, which is from the first processor, and storing the same in the frame buffer; and the processing operation executed by the second processor may include: outputting, by the second processor, the user interface screen using screen data stored in the frame buffer.

The at least one user interface screen includes a clock screen, the bypass operation executed by the second processor may include: inputting, by the second processor, screen data of time information to be output to the clock screen, which is from the first processor, and storing the same in the frame buffer; and the processing operation executed by the second processor may include: changing and outputting, by the second processor, time information of the clock screen using screen data of time information corresponding to the present time from among screen data of time information stored in the frame buffer when it is time to change time information of the clock screen.

The at least one user interface screen includes an alarm screen, the bypass operation executed by the second processor may include: inputting, by the second processor, screen data of alarm information to be output to the alarm screen, which is from the first processor, and storing the same in the frame buffer, and the processing operation executed by the second processor may include: outputting, by the second processor, the alarm screen using screen data of alarm information corresponding to the present time from among alarm information stored in the frame buffer when it is time to output the alarm screen.

The first processor is a main processor of the electronic device, which is an Application Processor (AP), and the second processor is a sub-processor that is connected between the first processor and a display, which is a Micro Controller Unit (MCU).

Figure 4:
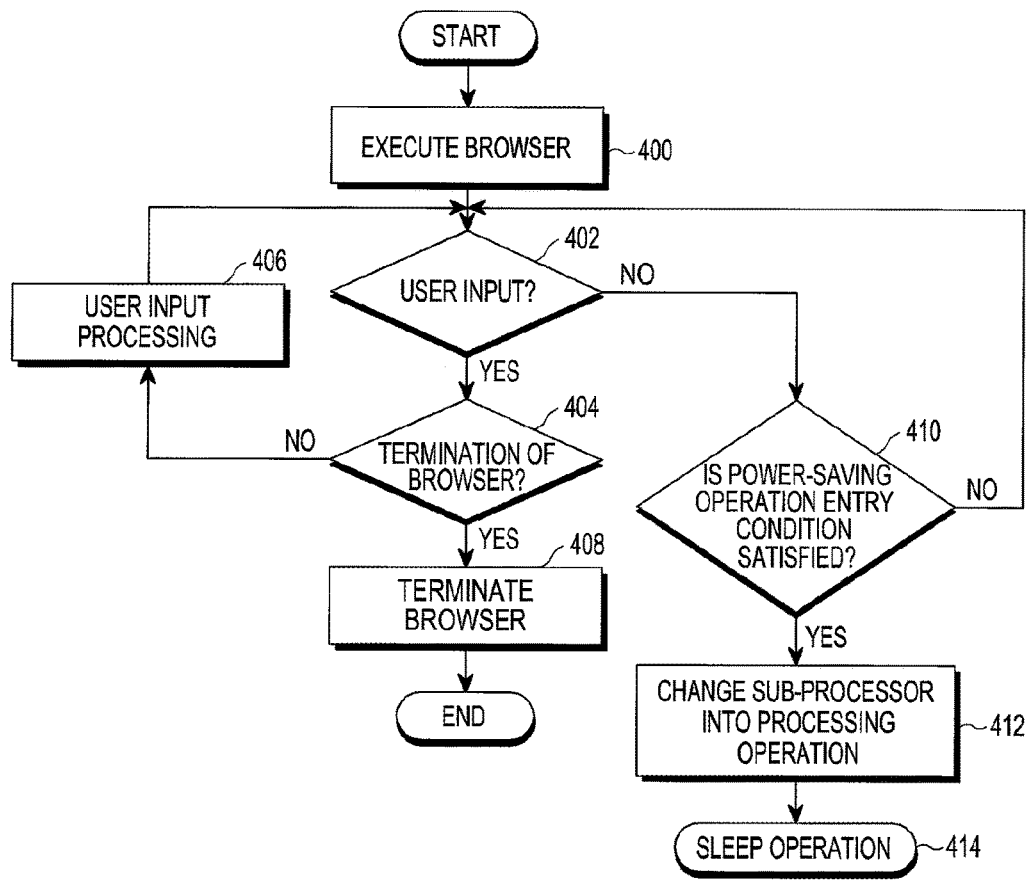
FIGS. 4 and 5 illustrate examples of a procedure in which an electronic device outputs a browser screen according to an embodiment of the present disclosure.
Figure 5:
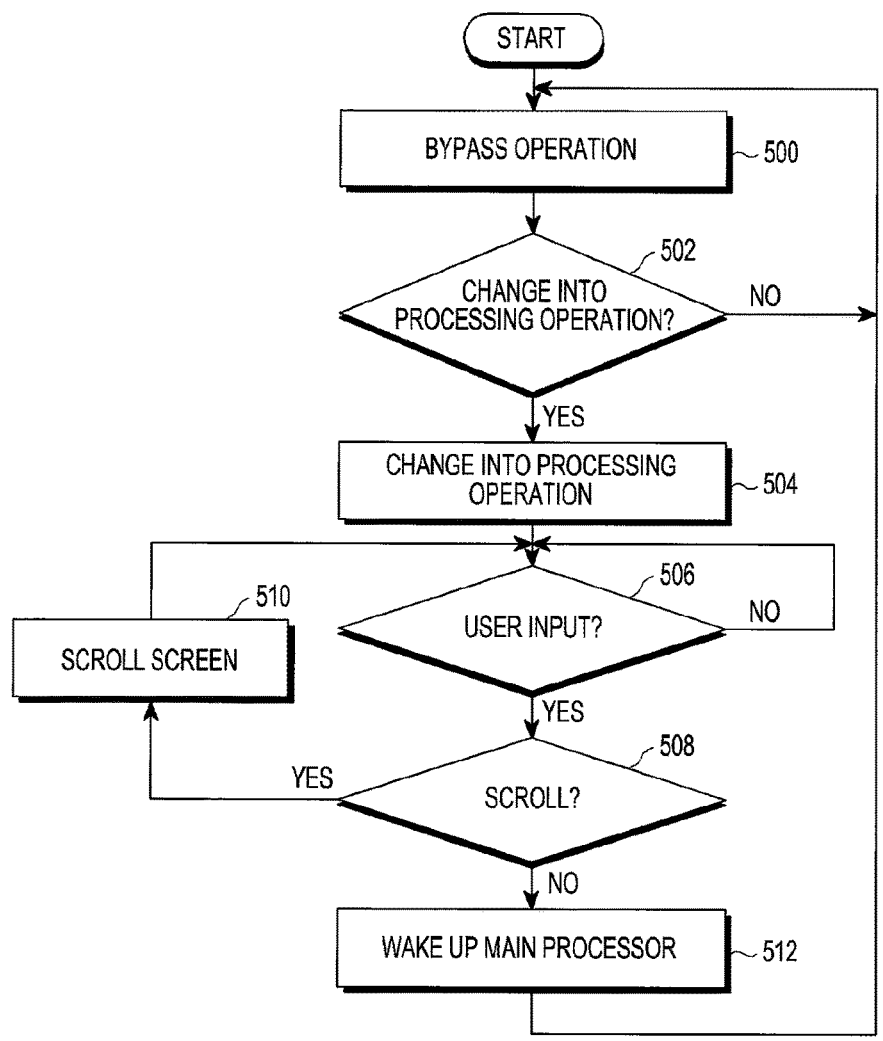

FIGS. 4 and 5 are flowcharts illustrating examples of a procedure in which an electronic device outputs a browser screen according to an embodiment of the present disclosure.

Referring to FIGS. 4 and 5, the main processor 202 may execute a browser during a processing operation such as the processing operation 300 as described above, in operation 400. In operation 400, the main processor 202 may load a browser screen from a site as a browser is executed, and may output screen data of the loaded browser screen to the sub-processor 204 that currently executes a bypass operation. In a bypass operation 500, the sub-processor 204 may store, in the frame buffer 210, screen data of the browser screen, which is input from the main processor 202, and outputs the same to the display 208. The bypass operation 500 may correspond to the above described bypass operation 310. In operation 400, the main processor 202 may store, in the frame buffer 210, screen data of a browser screen that is larger than the size of a screen of the display 208, through the sub-processor 204.

Figure 6:
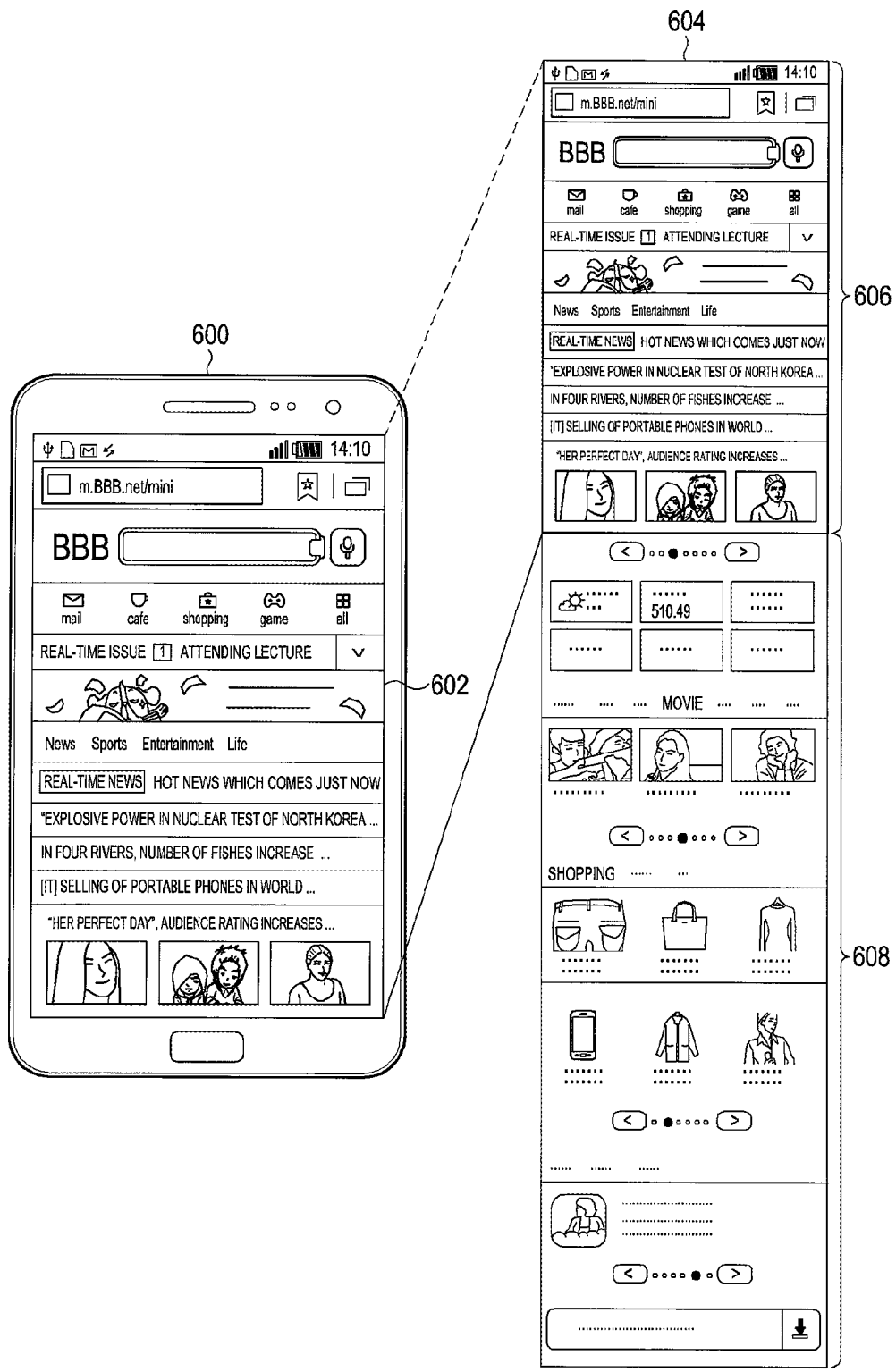
FIG. 6 illustrates an example in which an electronic device stores screen data of a browser screen in a frame buffer, and outputs the browser screen according to an embodiment of the present disclosure.

FIG. 6 is a diagram illustrating an example of storing screen data of a browser screen in a frame buffer, and outputting the browser screen according to an embodiment of the present disclosure.

Referring to FIG. 6, the main processor 202 may store, in the frame buffer 210, screen data of a browser screen 604 that is larger than the size of a screen 602 of the display 208 of an electronic device 600, through the sub-processor 204. The browser screen 604 stored in the frame buffer 210 may be a browser screen of a current page that is loaded from a site. The sub-processor 204 may output screen data of a screen 606 corresponding to the size of the screen 602 of the display 208, out of the browser screen 604, to the display 208. In this instance, the screen 606 corresponding to the size of the screen 602 of the display 208, out of the browser screen 604, may be output to the screen 602 of the display 208, and the remaining screen 608 may not be output.

Referring again to FIGS. 4 and 5, the main processor 202 may determine whether a user input through the input module 206 is received in operation 402. When a user input is received during the bypass operation 500, the sub-processor 204 may bypass the user input and transfer the same to the main processor 202.

When it is determined that the user input is not received in operation 402, the main processor 202 may determine whether a power-saving operation entry condition is satisfied in operation 410. In operation 410, when a time during which a screen is maintained without being changed since a user input is not received, does not reach the specified period of time, the main processor 202 may determine that the power-saving operation entry condition is not satisfied. When it is determined that the power-saving operation entry condition is not satisfied in operation 410, the main processor 202 may proceed with operation 402. When a time during which a screen is maintained without being changed since a user input is not received, reaches the period of time, the main processor 202 may determine that the power-saving operation entry condition is satisfied. When it is determined that the power-saving operation entry condition is satisfied in operation 410, the main processor 202 may proceed with operation 412.

When it is determined that the user input is received in operation 402, the main processor 202 may determine whether a user input is an input for instructing the termination of a browser in operation 404. When it is determined that the user input is not an input for instructing the termination of a browser, the main processor 202 may process the user input in operation 406 and may proceed with operation 402. In operation 404, when the user input is an input for instructing the termination of a browser, the main processor 202 may terminate the browser in operation 408.

In operation 412, the main processor 202 changes the sub-processor 204 into a processing operation, and changes the main processor 202 into a sleep operation 414. The sleep operation 414 may correspond to the above described sleep operation 306.

When the sub-processor 204 is instructed by the main processor 202 to change into a processing operation while executing the bypass operation 500 in operation 502, the sub-processor 204 may be changed into a processing operation such as the processing operation 312, in operation 504. In the processing operation, the sub-processor 204 may output a browser screen using screen data of the browser screen 604 that is stored in the frame buffer 210 during the bypass operation 500.

In operation 506, the sub-processor 204 determines whether a user input through the input module 206 is received during the processing operation. The user input may be a scroll input or an input other than the scroll input. The scroll input may be an input for scrolling a screen. The input other than the scroll input may include at least one of an input for selecting a menu or a content item on a browser screen, an input for instructing the termination of a browser, and the like. In a case of the scroll input, the sub-processor 204 may change and output a screen by using screen data of the browser screen 604 stored in the frame buffer 210. In a case of an input other than the scroll input, the sub-processor 204 may be incapable of changing and outputting a screen by using the screen data of the browser screen 604 stored in the frame buffer 210.

When it is determined that the user input through the input module 206 is received in operation 506, the sub-processor 204 may determine whether the user input is a scroll input in operation 508. When it is determined that the user input is received in operation 506, the sub-processor 204 may store the user input. When it is determined that the user input is a scroll input in operation 508, the sub-processor 204 may scroll the browser screen according to a scroll direction and output the same in operation 510, using screen data of the browser screen 604 that is stored in the frame buffer 210.

When it is determined that the user input is not an input other than the scroll input in operation 508, the sub-processor 204 may wake up the main processor 202 in operation 512 and execute the bypass operation 500. In operation 512, the sub-processor 204 may transfer, to the main processor 202, the user input stored during the processing operation.

The main processor 202 that is woken up from the sleep operation 414 by the sub-processor 204, may execute a processing operation such as the processing operation 300 as described above. The main processor 202 that wakes up from the sleep operation 414 receives, from the sub-processor 204, a user input that occurs during the sleep operation 414, and thus, may accurately process the user input.

For example, when a user scrolls a browser screen several times and touches a content item in the browser screen, the sub-processor 204 may transfer all of the scroll inputs and the touch input of the user to the main processor 204. The main processor 204 may accurately identify the content item on a touch location corresponding to the touch input, by taking into consideration the scroll inputs. Therefore, the main processor 202 may accurately process the user input in the processing operation, after being woken up.

Accordingly, when a screen is not changed during the specified period of time while a browser screen is output, the main processor 202 executes the sleep operation 414, and when a user input does not exist or a user input is a scroll input during the period of time, the sub-processor 204 processes a screen output on behalf of the main processor 202, and thus, the electronic device 200 may normally output a browser screen and reduce an amount of power consumed for driving the main processor 202.

When the electronic device 200 outputs an image screen, the electronic device 200 may execute a procedure substantially identical or similar to the operations described with reference to FIGS. 4 and 5. For example, when the electronic device 200 executes an image view program such as a gallery, the main processor 202 that executes the processing operation, stores screen data of an image screen in the frame buffer 210 and outputs the same to the display 208, through the sub-processor 204. When a power-saving operation entry condition is satisfied while the image screen is output, the main processor 202 changes into a sleep operation, and the sub-processor 204 may process a scroll input associated with an image screen using screen data of the image screen stored in the frame buffer 210, on behalf of the main processor 202. Those skilled in the art may readily understand a power-saving operation when the electronic device 200 outputs an image screen, with references to FIGS. 4, 5 and 6 and thus, detailed descriptions thereof will be omitted.

Figure 7:
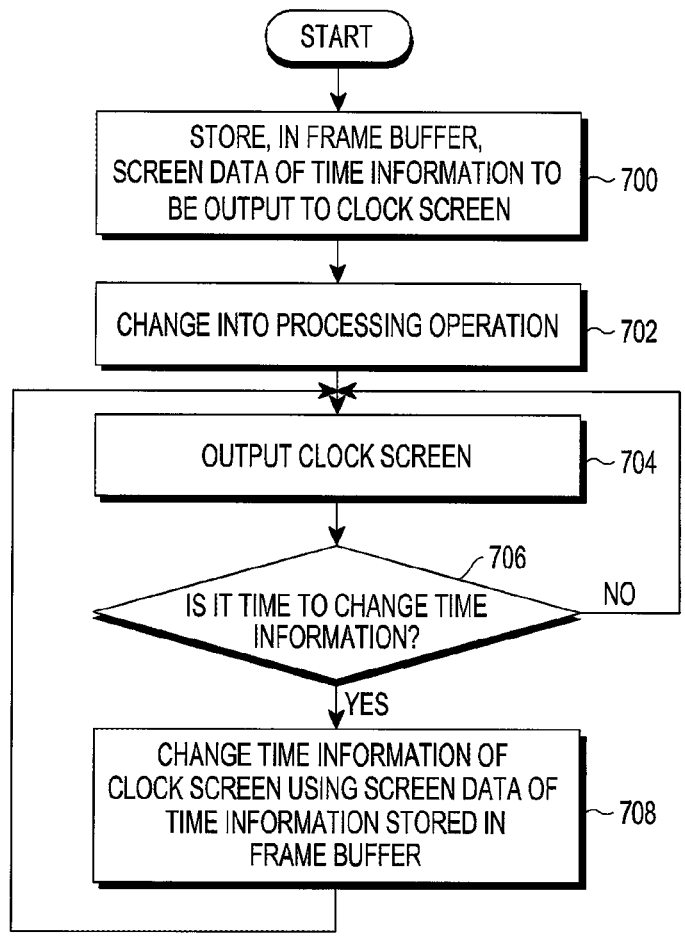
FIG. 7 illustrates an example of a procedure in which an electronic device outputs a clock screen according to various embodiments of the present disclosure.

FIG. 7 is a flowchart illustrating an example of a procedure in which an electronic device outputs a clock screen according to various embodiments of the present disclosure.

Referring to FIG. 7, according to an embodiment of the present disclosure, the main processor 202 and the sub-processor 204 may execute operations illustrated in FIG. 7, in a case where a clock screen is output. In operation 700, the sub-processor 204 inputs screen data of time information to be output to a clock screen, which is from the main processor 202, and stores the same in the frame buffer 210, during a bypass operation (e.g., the bypass operation 310). In operation 700, the main processor 204 stores, in the frame buffer 210, the screen data of the time information to be output to a clock screen during the processing operation (e.g., the processing operation 300), through the sub-processor 204. The screen data of the time information may include screen data for displaying times. The screen data of the time information may further include screen data for displaying dates. The screen data of the time information may further include data of various other information that may be included in a clock screen.

Figure 8:
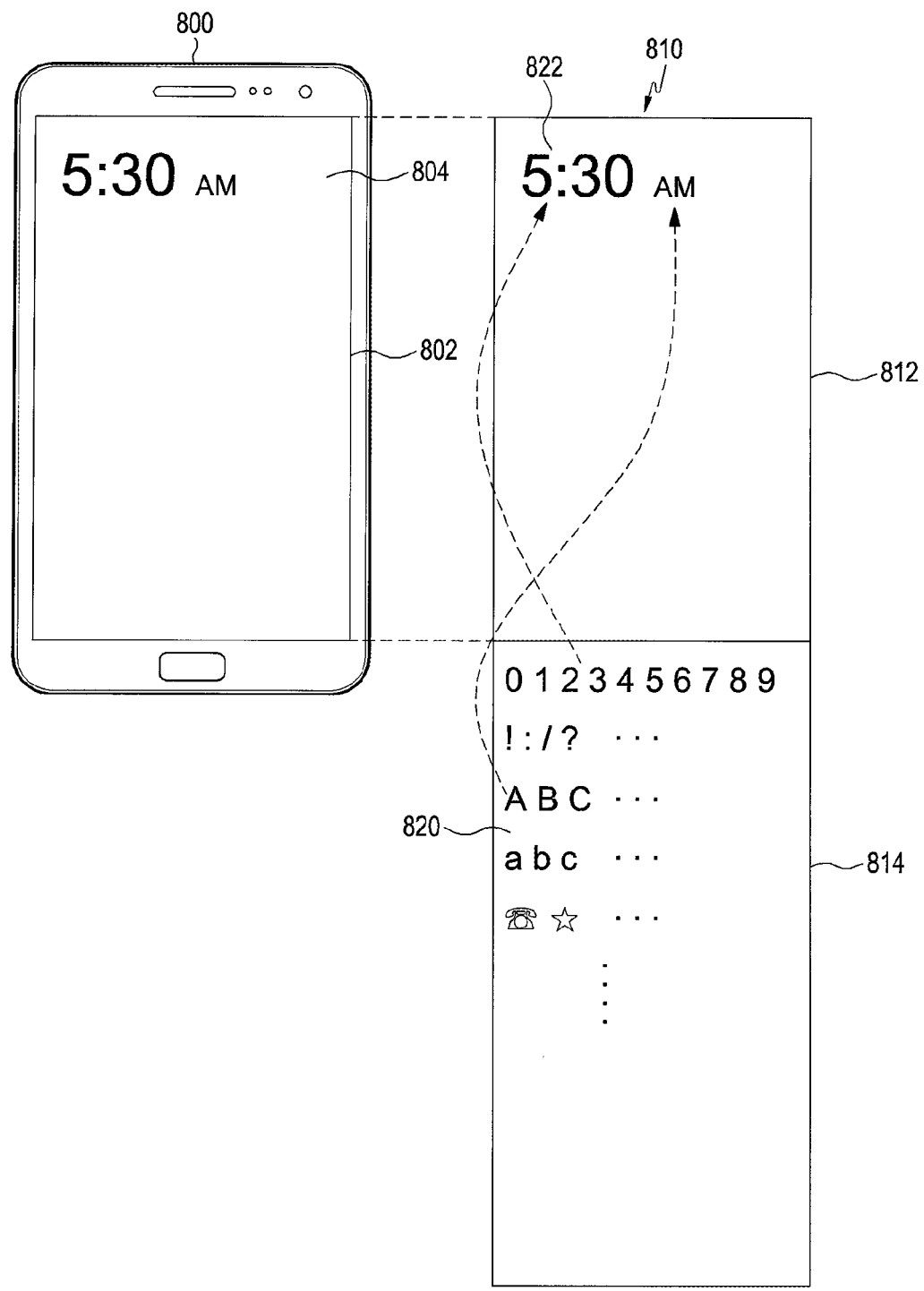
FIG. 8 illustrates an example in which an electronic device stores screen data of a clock screen in a frame buffer, and outputs the clock screen according to an embodiment of the present disclosure.

FIG. 8 is a diagram illustrating an example in which an electronic device stores screen data of a clock screen in a frame buffer, and outputs the clock screen according to an embodiment of the present disclosure.

Referring to FIG. 8, the main processor 202 may store, in a frame buffer 810 (e.g., the frame buffer 210), screen data 820 of time information to be output to a clock screen 804 through a display 802 of an electronic device 800. The frame buffer 810 may include a first buffer area 812 and a second buffer area 814. The first buffer area 812 may store screen data forming a screen that is output through the display 802. The second buffer area 814 may store screen data 820 of time information that is input from the main processor 202. The screen data 820 may include font data that may indicate various time information. The sub-processor 204 may copy screen data corresponding to time information to be output to the clock screen 804 out of the screen data 820 of time information stored in the second buffer area 814, bring it to the first buffer area 812, and may form a screen including time information 822.

Referring again to FIG. 7, the sub-processor 204 that executes the bypass operation may be changed by the main processor 202 into a processing operation in operation 702. In operation 702, the main processor 202 changes the sub-processor 204 into the processing operation such as the processing operation 312 as described above, and may change the main processor 202 into a sleep operation such as the sleep operation 306.

In operation 704, the sub-processor 204 may output, through the display 208, a clock screen that displays the current time, current time and date, or the like, using screen data of time information stored in the frame buffer 210, during the processing operation. While the clock screen is output, the sub-processor 204 determines whether the current time is a time for changing time information, in operation 706. For example, when the currently output clock screen is specified to change and output time based on a minute, the sub-processor 204 may determine that the current time is a time for changing the time information when the minute-based time changes.

When it is determined that the current time is a time for changing time information in operation 706, the sub-processor 204 changes time information of the clock screen using screen data of time information corresponding to the current time out of screen data of time information stored in the frame buffer 810 in operation 708, and outputs the changed clock screen in operation 704.

Accordingly, when a screen is not changed during the specified period of time while the electronic device 200 outputs a clock screen, the main processor 202 executes a sleep operation, and when time information of the clock screen needs to be changed while the main processor 202 executes the sleep operation, the sub-processor 204 processes a screen output on behalf of the main processor 202, so that the clock screen is normally output and an amount of power consumed for driving the main processor 202 may be reduced.

Figure 9:
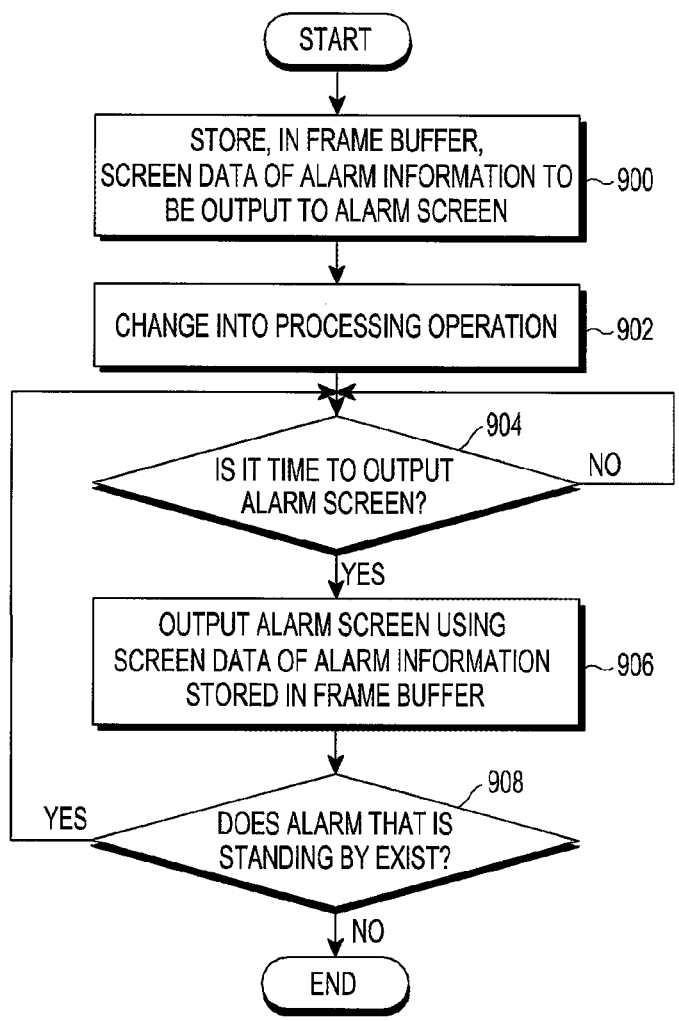
FIG. 9 illustrates an example of a procedure in which an electronic device outputs an alarm screen according to another embodiment of the present disclosure.

FIG. 9 is a flowchart illustrating an example of a procedure in which an electronic device outputs an alarm screen according to another embodiment of the present disclosure.

Referring to FIG. 9, according to an embodiment of the present disclosure, the main processor 202 and the sub-processor 204 may execute an operation 900, in a case in which an alarm is set. In operation 900, the main processor 202 transfers time information of the set alarm to the sub-processor 204. In operation 900, the sub-processor 204 inputs screen data of time information to be output to an alarm screen, which is from the main processor 202, and stores the same in the frame buffer 210, during a bypass operation (e.g., the bypass operation 310). In operation 900, the main processor 202 stores, in the frame buffer 210, the screen data of the time information to be output to an alarm screen during the processing operation (e.g., the processing operation 300), through the sub-processor 204. The screen data of the alarm information may include screen data for displaying a specified alarm message.

Figure 10:
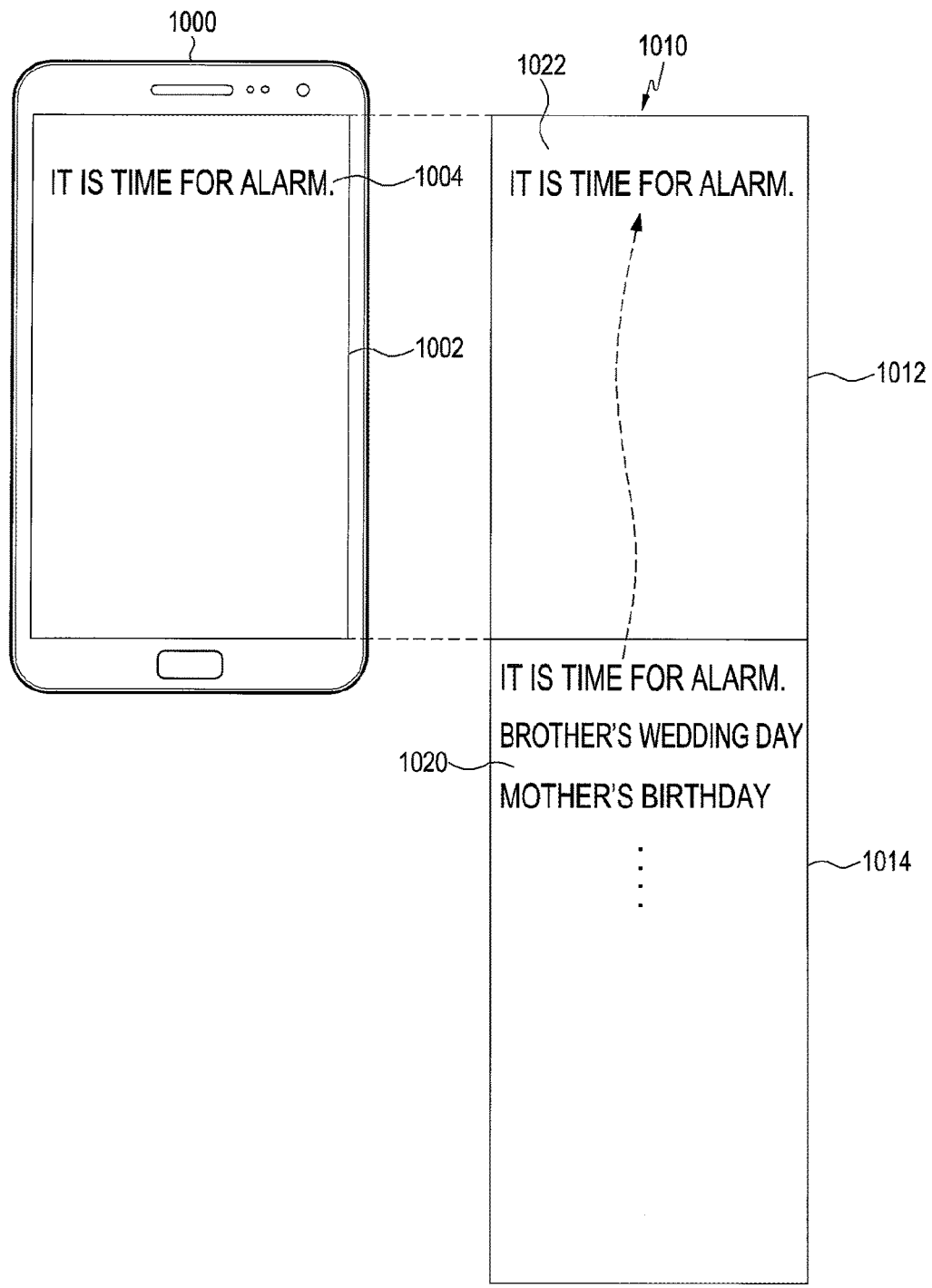
FIG. 10 illustrates an example in which an electronic device stores screen data of an alarm screen in a frame buffer, and outputs the alarm screen according to an embodiment of the present disclosure.

FIG. 10 is a diagram illustrating an example in which an electronic device stores screen data of an alarm screen in a frame buffer, and outputs the alarm screen according to an embodiment of the present disclosure.

Referring to FIG. 10, the main processor 202 may store, in a frame buffer 1010 (e.g., the frame buffer 210), screen data 1020 of alarm information to be output to an alarm screen 1004 through a display 1002 of an electronic device 1000. The frame buffer 1010 may include a first buffer area 1012 and a second buffer area 1014. The first buffer area 1012 may store screen data forming a screen that is output through the display 1002. The second buffer area 1014 may store screen data 1020 of alarm information that is input from the main processor 202. The screen data 1020 may include screen data for displaying contents of a specified alarm message. The sub-processor 204 may copy screen data corresponding to various alarm information to be output to the alarm screen 1004, out of the screen data 1020 of alarm information stored in the second buffer area 1014, bring it to the first buffer area 1012, and may form a screen including alarm information 1022.

Referring again to FIG. 9, the sub-processor 204 that executes the bypass operation may be changed by the main processor 202 into a processing operation in operation 902. In operation 902, the main processor 202 changes the sub-processor 204 into the processing operation such as the processing operation 312 as described above, and may change the main processor 202 into a sleep operation such as the sleep operation 306.

When it is determined that the current time is an alarm time for outputting the alarm screen in operation 904, the sub-processor 204 outputs an alarm screen that displays an alarm message using screen data of alarm information stored in the frame buffer 1010, through the display 208 during the processing operation, in operation 906.

In operation 908, the sub-processor 204 determines whether another set alarm, which is standing by, exists. In operation 908, when an alarm that is standing by exists, the sub-processor 204 may proceed with operation 904. When it is determined that an alarm that is standing by does not exist, the sub-processor 204 may terminate the processing operation for outputting an alarm screen.

Therefore, in a case in which an alarm is set in the electronic device 200, when the main processor 202 executes a sleep operation after an alarm is set, and an alarm screen needs to be output while the main processor 202 executes the sleep operation, the sub-processor 204 processes a screen output on behalf of the main processor 202, so that the alarm screen is normally output and an amount of power consumed for driving the main processor 202 may be reduced.

Figure 11:
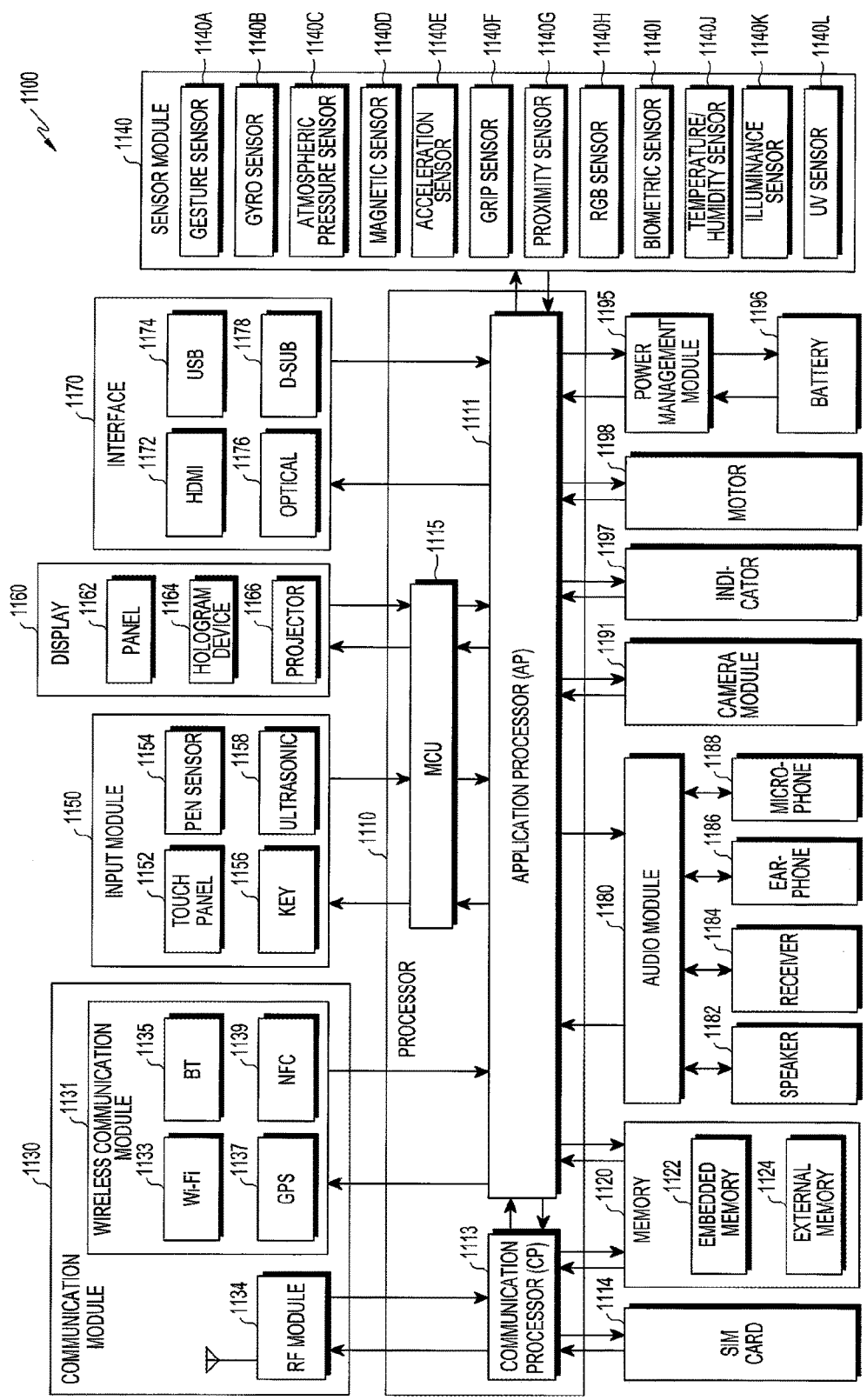
FIG. 11 illustrates a detailed structure of an electronic device according to various embodiments of the present disclosure.

FIG. 11 is a block diagram of a detailed structure of an electronic device according to various embodiments of the present disclosure.

An electronic device 1100 of FIG. 11 may form, for example, a part or the entirety of the electronic device 101 of FIG. 1 or the electronic device 200 of FIG. 2.

Referring to FIG. 11, the electronic device 1100 may include at least one processor 1110, a Subscriber Identification Module (SIM) card 1114, a memory 1120, a communication module 1130, a sensor module 1140, an input module 1150, a display 1160, an interface 1170, an audio module 1180, a camera module 1191, a power management module 1195, a battery 1196, an indicator 1197, or a motor 1198.

The processor 1110 may include one or more Application Processors (APs) 1011, one or more Communication Processors (CPs) 1013, or a Micro Controller Unit (MCU) 1115. The processor 1110 may be, for example, the processor 120 illustrated FIG. 1. The AP 1111 and the MCU 1115 may be the main processor 202 and the sub-processor 204 as illustrated in FIG. 2, respectively. Although it is illustrated that the AP 1111, the CP 1113, and the MCU 1115 are included in the processor 1010 in FIG. 11, the AP 1111, the CP 1113, and the MCU 1115 may be included in different IC packages. According to another embodiment of the present disclosure, the AP 1111, the CP 1113, and the MCU 1115 may be included in a single IC package.

The AP 1111 may drive an operation system or an application program so as to control a plurality of hardware or software component elements connected to the AP 1111, and may execute data processing and operation associated with various data including multimedia data. The AP 1111 may be embodied as, for example, a System on Chip (SoC). According to an embodiment of the present disclosure, the processor 1110 may further include a Graphic Processing Unit (GPU) (not illustrated).

The CP 1113 may manage a data link in communication between the electronic device 1100 and other electronic devices connected over a network, and may convert a communication protocol. The CP 1113 may be embodied as, for example, an SoC. According to an embodiment of the present disclosure, the CP 1113 may perform at least some of the multimedia controlling functions. The CP 1113 may identify and authenticate the electronic device 1100 in a communication network using a Subscriber Identification Module (e.g., an SIM card 1114). In addition, the CP 1113 may provide a user with services, such as a voice call service, a video call service, a short message service, a packet data service, and the like.

The MCU 1115 may process a user input through the input module 1150 and a screen output through the display 1160, on behalf of the AP 1111, while the AP 1111 executes a sleep operation.

Furthermore, the CP 1113 may control data transmission and reception of the communication module 1130. Although the component elements such as the CP 1113, the power management module 1195, or the memory 1120 are illustrated as separate component elements from the AP 1111, the AP 1111 may be embodied to include at least a few of the described component elements, for example, the CP 1113.

According to an embodiment of the present disclosure, the AP 1111, the CP 1113, or the MCU 1115 may load, in a volatile memory, an instruction or data received from at least one of a non-volatile memory and other component elements connected to each entity, and may process the same. Also, the AP 1111, the CP 1113, or the MCU 1115 may store, in a non-volatile memory, data that may be received from or generated by at least one of other component elements.

The SIM card 1114 may be a card embodying a subscriber identity module, and may be inserted into a slot formed in a particular portion of the electronic device 1100. The SIM card 1114 may include unique identification information (e.g. an integrated circuit card identifier (ICCID)) or unique subscriber information (e.g., an international mobile subscriber identity (IMSI)).

The memory 1120 may include an embedded memory 1122 or an external memory 1124. The memory 1120 may be, for example, the memory 130 of FIG. 1. The embedded memory 1122 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like). According to an embodiment of the present disclosure, the embedded memory 1122 may be a Solid State Drive (SSD). The external memory 1124 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 1124 may be functionally connected to the electronic device 900 through various interfaces.

Although not illustrated, the electronic device 1100 may further include a storage device (or a storage medium) such as a hard drive device.

The communication module 1130 may include a wireless communication module 1131 or a radio frequency (RF) module 1134. The communication module 1130 may be included in, for example, the communication interface 170 of FIG. 1. The wireless communication module 1131 may include, for example, Wi-Fi 1133, BlueTooth (BT) 1135, a Global Positioning System (GPS) 1137, or a Near Field Communication (NFC) 1139. For example, the wireless communication module 1131 may provide a wireless communication function using a wireless frequency. Additionally or alternatively, the wireless communication module 1131 may include a network interface (e.g., a LAN card), a modem or the like for connecting the electronic device 1100 to a network (e.g., Internet, a Local Area Network (LAN), a Wireless Area Network (WAN), a communication network, a cellular network, a satellite network, a Plain Old Telephone Service (POTS), and the like).

The RF module 1134 may process transmission and reception of a voice or data signal. The RF module 1134 may include, for example, a transceiver, a Power Amplifier Module (PAM), a frequency filter, a Low Noise Amplifier (LNA), or the like, although not illustrated. Also, the RF module 1134 may further include a component for transmitting and receiving an electromagnetic wave in a free air space in wireless communication, for example, a conductive substance, a conductive wire, or the like.

The sensor module 1140 may include at least one of, for example, a gesture sensor 1140A, a gyro sensor 1140B, an atmospheric pressure sensor 1140C, a magnetic sensor 1140D, an acceleration sensor 1140E, a grip sensor 1140F, a proximity sensor 1140G, a Red, Green, and Blue (RGB) sensor 1140H, a biometric sensor 11401, a temperature/humidity sensor 11401, an illuminance sensor 1140K, an Ultraviolet (UV) sensor 1140L, and an Infrared (IR) sensor (not illustrated). The sensor module 1140 may measure a physical quantity or detect an operating state of the electronic device, and may convert the measured or detected information into an electric signal. Additionally or alternatively, the sensor module 1140 may include, for example, an olfactory sensor (E-nose sensor; not illustrated), an ElectroMyoGraphy sensor (EMG sensor; not illustrated), an ElectroEncephaloGram sensor (EEG; not illustrated), an ElectroCardioGram sensor (ECG; not illustrated), a fingerprint sensor, or the like. The sensor module 1140 may further include a control circuit for controlling one or more sensors included therein.

The input module 1150 may include a touch panel 1152, a (digital) pen sensor 1154, a key 1156, or an ultrasonic input device 1158. The input module 1150 may be included in, for example, the input/output interface 150 of FIG. 1. The touch panel 1152 may recognize a touch input in at least one of, for example, a capacitive type, a resistive type, an infrared type, and an ultrasonic type. In addition, the touch panel 1152 may further include a controller (not illustrated). A capacitive-type touch panel may detect not only a physical contact but also proximity. The touch panel 1152 may further include a tactile layer function. In this case, the touch panel 1152 may provide a user with a tactile reaction.

The (digital) pen sensor 1154 may be embodied, for example, using a method identical or similar to a method of receiving a touch input of a user, or using a separate recognition sheet. The key 1156 may include, for example, a physical button. Alternatively, the key 1156 may include, for example, an optical key, a key pad, or a touch key. The ultrasonic input device 1158 is a device that may detect ultrasonic waves generated by an input tool, through a microphone (e.g., the microphone 1188), and identify data, which may be capable of wireless recognition. According to an embodiment of the present disclosure, the electronic device 1100 may use the communication module 1130 to receive a user input from an external device connected thereto (e.g., a network, a computer, or a server).

The display 1160 may include a panel 1162, a hologram 1164, or a projector 1166. The display 1160 may be, for example, the display 160 of FIG. 1. For example, the panel 1162 may be, for example, a Liquid Crystal Display (LCD), an Active Matrix Organic Light Emitting Diode (AM-OLED), or the like. The panel 1162 may be implemented to be, for example, flexible, transparent, or wearable. The panel 1162 and the touch panel 1152 may be embodied as a single module. The hologram 1164 may show a three dimensional image in the air using interference of light. The projector 1166 shows an image on an external screen using projection of light. According to an embodiment of the present disclosure, the display 1160 may further include a control circuit for controlling the panel 1162, the hologram device 1164, or the projector 1166.

The interface 1170 may include, for example, a High-Definition Multimedia Interface (HDMI) 1172, a Universal Serial Bus (USB) 1174, Optical communication 1176, or D-subminiature (D-sub) 1178. The interface 1170 may be included in, for example, the communication interface 170 illustrated in FIG. 1. Additionally or alternatively, the interface 1170 may include, for example, Mobile High-definition Link (MHL), Secure Digital (SD)/Multi-Media Card (MMC; not illustrated) or Infrared Data Association (IrDA; not illustrated).

The audio module 1180 may bilaterally convert sound and an electronic signal. The audio module 1180 may be included in, for example, the input/output interface 150 of FIG. 1. The audio module 1180 may process sound information that is input or output through, for example, a speaker 1182, a receiver 1184, an earphone 1186, the microphone 1188, or the like.

The camera module 1191 is a device for capturing an image or a video, and, according to an embodiment of the present disclosure, may include one or more image sensors (e.g., a front sensor or a back sensor), a lens, an Image Signal Processor (ISP) (not illustrated), or a flash (not illustrated) (e.g., an LED or xenon lamp).

The power management module 1195 may manage power of the electronic device 1100. Although not illustrated, the power management module 1195 may include, for example, a Power Management Integrated Circuit (PMIC), a charger Integrated Circuit (IC), or a battery fuel gauge.

The PMIC may be mounted to, for example, an integrated circuit or an SoC semiconductor. Charging methods may be classified into a wired charging method and a wireless charging method. The charger IC may charge a battery and may prevent an overvoltage or excess current from being induced or flowing from a charger. According to an embodiment of the present disclosure, the charger IC may include a charger IC for at least one of the wired charging method and the wireless charging method. The wireless charging method may include a magnetic resonance scheme, a magnetic induction scheme, or an electromagnetic scheme, and an additional circuit for wireless charging, such as a coil loop circuit, a resonance circuit, a rectifier circuit, and the like may be added.

The battery gauge may measure, for example, a residual quantity of the battery 1196, and a voltage, a current, or a temperature during the charging. The battery 1196 may store electricity and supply power. The battery 1196 may include, for example, a rechargeable battery or a solar battery.

The indicator 1197 may display a specific state, such as a booting state, a message state, a charging state, of the electronic device 100 or a part (e.g., the AP 1111) of the electronic device 1100. The motor 1198 may convert an electric signal to a mechanical vibration.

Although not illustrated, the electronic device 1100 may include a processing unit (e.g., a GPU) for supporting a mobile television (TV). The processing unit for supporting a mobile TV may process, for example, media data pursuant to a certain standard of Digital Multimedia Broadcasting (DMB), Digital Video Broadcasting (DVB), or mediaFLO'.

The above described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding elements prior to the combination.

The "module" used in various embodiments of the present disclosure may refer to, for example, a "unit" including one of hardware, software, and firmware, or a combination of two or more of the hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations that have been known or are to be developed hereafter.

According to various embodiments, at least some of the devices (e.g., modules or functions thereof) or methods (e.g., operations) according to the various embodiments of the present disclosure may be implemented as, for example, an instruction stored in a computer readable storage medium in the form of a programming module. The instruction, when executed by at least one processor (e.g., the processor 120, the main processor 202, or the sub-processor 204), may cause the at least one processor to execute a function corresponding to the instruction. The computer readable storage medium may be, for example, a memory that can be included in the memory 130 or the sub-processor 204. At least a part of the programming module may, for example, be implemented (e.g., executed) by a processor. At least a part of the programming module may include, for example, a module, a program, a routine, a set of instructions and/or a process for performing one or more functions.

The computer readable recoding medium may include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program instruction (for example, a programming module), such as a Read Only Memory (ROM), a Random Access Memory (RAM), a flash memory, and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

The electronic device according to various embodiments of the present disclosure may receive and store programs including instructions for performing the power saving method from a program providing device that is connected by wired or wirelessly to the electronic device. Alternatively, various electronic devices or servers may be the program providing device. The program providing device may include a memory for storing the programs, a communication module for performing wired or wireless communication with the electronic device, and a processor for transmitting the corresponding program to the electronic device at the request of the electronic device or automatically.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of saving power in an electronic device, the method comprising:
bypassing, by a second processor in the electronic device, at least one of a user input and a screen output with respect to a first processor in the electronic device;
storing, by the second processor, screen data input from the first processor in a frame buffer while the second processor executes a bypass operation;
processing, by the first processor, at least one of the user input and the screen output through the second processor that executes the bypass operation;
changing, by the first processor, the second processor into a processing operation and changing the first processor into a sleep operation when a specified power-saving operation entry condition is satisfied; and
processing, by the second processor, at least one of the user input and the screen output using the screen data stored in the frame buffer until a specified power-saving operation termination condition is satisfied, while the second processor executes the processing operation, wherein:
the bypass operation executed by the second processor comprises:
inputting, by the second processor, screen data of a browser screen that is larger than a size of a screen of a display, which is from the first processor, and storing the screen data in the frame buffer; and
the processing operation executed by the second processor comprises scrolling, by the second processor, the browser screen to correspond to a scroll input using the screen data stored in the frame buffer when the scroll input from a user is received.

2. The method of claim 1, wherein the processing operation executed by the second processor further comprises waking up the first processor and changing the second processor into the bypass operation when the power-saving operation termination condition is satisfied.

3. The method of claim 2, wherein the power-saving operation entry condition is specified as a state in which a screen is not changed during a specified period of time, and the power-saving operation termination condition is specified as a state in which the screen is incapable of being output based on the screen data stored in the frame buffer.

4. The method of claim 2, wherein:
the processing operation executed by the second processor further comprises storing a user input when the user input is received; and
the waking up of the first processor and the changing of the second processor into the bypass operation comprises transferring, by the second processor, the stored user input to the first processor.

5. The method of claim 1, wherein the first processor is a main processor of the electronic device, which is an application processor (AP), and the second processor is a subprocessor that is connected between the first processor and a display, which is a micro controller unit (MCU).

6. The method of claim 1, wherein:
the bypass operation executed by the second processor comprises:
inputting, by the second processor, screen data to be used for outputting each of at least one user interface screen, which is from the first processor, and storing the screen data of the interface screen in the frame buffer; and
the processing operation executed by the second processor comprises outputting, by the second processor, the user interface screen using the screen data of the interface screen stored in the frame buffer.

7. The method of claim 6, wherein:
the at least one user interface screen includes a clock screen;
the bypass operation executed by the second processor comprises:
inputting, by the second processor, screen data of time information to be output to the clock screen, which is from the first processor, and storing the screen data of time information in the frame buffer; and
the processing operation executed by the second processor comprises changing and outputting, by the second processor, time information of the clock screen using the screen data of time information corresponding to a present time from among the screen data of time information stored in the frame buffer when it is time to change time information of the clock screen.

8. The method of claim 6, wherein:
the at least one user interface screen includes an alarm screen;

the bypass operation executed by the second processor comprises:
  inputting, by the second processor, screen data of alarm information to be output to the alarm screen, which is from the first processor, and
  storing the screen data of alarm information in the frame buffer; and
the processing operation executed by the second processor comprises outputting, by the second processor, the alarm screen using the screen data of alarm information corresponding to a present time from among the alarm information stored in the frame buffer when it is time to output the alarm screen.

9. A method of saving power in an electronic device, the method comprising:
  bypassing, by a second processor in the electronic device, at least one of a user input and a screen output with respect to a first processor in the electronic device;
  storing, by the second processor, screen data input from the first processor in a frame buffer while the second processor executes a bypass operation;
  processing, by the first processor, at least one of the user input and the screen output through the second processor that executes the bypass operation;
  changing, by the first processor, the second processor into a processing operation and changing the first processor into a sleep operation when a specified power-saving operation entry condition is satisfied; and
  processing, by the second processor, at least one of the user input and the screen output using the screen data stored in the frame buffer until a specified power-saving operation termination condition is satisfied, while the second processor executes the processing operation
wherein:
the bypass operation executed by the second processor comprises:
  inputting, by the second processor, screen data of an image to be output to an image screen, which is from the first processor, and
  storing the screen data in the frame buffer; and
the processing operation executed by the second processor comprises scrolling, by the second processor, the image screen to correspond to a scroll input using the screen data stored in the frame buffer when the scroll input from a user is received.

10. An electronic device, comprising:
an input module configured to receive an input from a user;
a display configured to output a screen based on screen data;
a frame buffer configured to store the screen data for outputting the screen through the display;
a first processor configured to:
  process at least one of a user input through the input module and a screen output through the display, through a second processor executing a bypass operation; and
  change the second processor into a processing operation and the first processor into a sleep operation when a specified power-saving operation entry condition is satisfied; and
the second processor configured to:
  bypass at least one of the user input and the screen output between the input module and display and the first processor;
  store screen data that is input from the first processor in the frame buffer, while the second processor executes the bypassing operation; and
  process at least one of the user input and the screen output using the screen data stored in the frame buffer until a specified power-saving operation termination condition is satisfied, while the second processor executes the processing operation,
wherein:
a storage capacity of the frame buffer is larger than a size of a screen of the display; and
during the bypass operation, the second processor is further configured to:
  input screen data of a browser screen that is larger than the size of the screen of the display, which is from the first processor, and
  store the screen data in the frame buffer, and
during the processing operation, the second processor is further configured to scroll the browser screen to correspond to a scroll input using the screen data stored in the frame buffer when the scroll input from a user is received.

11. The electronic device of claim 10, wherein when the power-saving operation termination condition is satisfied while the second processor executes the processing operation, the second processor is further configured to:
  wake up the first processor and
  change the second processor into the bypass operation.

12. The electronic device of claim 11, wherein the second processor is further configured to:
  store a user input when the user input is received during the processing operation, and
  transfer the stored user input to the first processor when waking up the first processor.

13. The electronic device of claim 10, wherein the power-saving operation entry condition is specified as a state in which the screen is not changed during a specified period of time, and wherein the power-saving operation termination condition is specified as a state in which the screen is incapable of being output based on only screen data stored in the frame buffer.

14. The electronic device of claim 10, wherein:
during the bypass operation, the second processor is further configured to:
  input screen data to be used for outputting each of at least one user interface screen, which is from the first processor, and
  store the screen data of the user interface screen in the frame buffer, and
during the processing operation, the second processor is further configured to output the user interface screen using the screen data stored in the frame buffer.

15. The electronic device of claim 14, wherein:
the at least one user interface screen includes a clock screen; and
during the bypass operation, the second processor is further configured to:
  input screen data of time information to be output to the clock screen, which is from the first processor, and
  store the screen data of time information in the frame buffer, and
during the processing operation, the second processor is further configured to change and output time information of the clock screen using the screen data of time information corresponding to a present time from among the screen data of time information stored in the frame buffer when it is time to change time information of the clock screen.

16. The electronic device of claim 14, wherein:
the at least one user interface screen includes an alarm screen; and
during the bypass operation, the second processor is further configured to:
  input screen data of alarm information to be output to the alarm screen, which is from the first processor, and
  store the screen data of alarm information in the frame buffer, and
during the processing operation, the second processor is further configured to output the alarm screen using the screen data of alarm information corresponding to a present time from among the alarm information stored in the frame buffer when it is time to output the alarm screen.

17. The electronic device of claim 10, wherein the first processor is a main processor of the electronic device, which is an application processor (AP), and the second processor is a sub-processor that is connected between the first processor and the display, which is a micro controller unit (MCU).

18. An electronic device of comprising:
an input module configured to receive an input from a user;
a display configured to output a screen based on screen data;
a frame buffer configured to store the screen data for outputting the screen through the display;
a first processor configured to:
  process at least one of a user input through the input module and a screen output through the display, through a second processor executing a bypass operation; and
  change the second processor into a processing operation and the first processor into a sleep operation when a specified power-saving operation entry condition is satisfied; and
the second processor configured to:
  bypass at least one of the user input and the screen output between the input module and display and the first processor;
  store screen data that is input from the first processor in the frame buffer, while the second processor executes the bypassing operation; and
  process at least one of the user input and the screen output using the screen data stored in the frame buffer until a specified power-saving operation termination condition is satisfied, while the second processor executes the processing operation,
wherein:
during the bypass operation, the second processor is further configured to:
  input screen data of an image to be output to an image screen, which is from the first processor, and
  store the screen data in the frame buffer, and
during the processing operation, the second processor is further configured to scroll the image screen to correspond to a scroll input using the screen data stored in the frame buffer when the scroll input from a user is received.

* * * * *